United States Patent [19]

Weder

[11] Patent Number: 4,950,216
[45] Date of Patent: Aug. 21, 1990

[54] METHOD OF FORMING A FLOWER POT

[75] Inventor: Donald E. Weder, Highland, Ill.

[73] Assignee: Highland Supply Corporation, Highland, Ill.

[21] Appl. No.: 248,961

[22] Filed: Sep. 26, 1988

Related U.S. Application Data

[63] Continuation-in-part of Ser. No. 219,083, Jul. 13, 1988, Pat. No. 4,897,031, which is a continuation of Ser. No. 4,275, Jan. 5, 1987, Pat. No. 4,773,182, which is a continuation of Ser. No. 613,080, May 22, 1984, abandoned.

[51] Int. Cl.⁵ .......................... B31F 1/08; B31D 5/04
[52] U.S. Cl. ................................... 493/162; 47/41.01; 47/66; 493/951; 493/167; 493/405; D11/164; 383/104
[58] Field of Search .......................... 47/41 R, 66, 73; 383/104, 908; 428/35.2, 35.5; 493/162, 951, 167, 405

[56] References Cited

U.S. PATENT DOCUMENTS

| 239,987 | 4/1981 | Shellenberger . | |
| D. 254,659 | 4/1980 | Karotseris | D11/143 |
| 292,562 | 11/1987 | Weder et al. | D11/164 |
| D. 292,562 | 11/1987 | Weder et al. | D11/164 |
| 292,563 | 11/1987 | Weder et al. | D11/164 |
| D. 292,563 | 11/1987 | Weder et al. | D11/164 |
| 293,224 | 12/1987 | Weder et al. | D11/164 |
| D. 293,224 | 12/1987 | Weder et al. | D11/164 |
| 293,774 | 1/1988 | Weder et al. | D11/164 |
| D. 293,774 | 1/1988 | Weder et al. | D11/164 |
| 293,775 | 1/1988 | Weder et al. | D11/164 |
| D. 293,775 | 1/1988 | Weder et al. | D11/164 |
| 716,668 | 12/1902 | Cheney . | |
| 732,889 | 7/1903 | Paver . | |
| 923,663 | 6/1909 | Kroeger . | |
| 1,002,346 | 9/1911 | Weeks . | |
| 1,052,379 | 2/1913 | Ranken . | |
| 1,069,675 | 8/1913 | Claussen . | |
| 1,206,708 | 11/1916 | Hutchins . | |
| 1,421,027 | 6/1922 | Reynolds . | |
| 1,421,628 | 7/1922 | Watkins . | |
| 1,693,435 | 11/1928 | Clarke . | |
| 1,863,216 | 6/1932 | Wordingham . | |
| 1,920,533 | 8/1933 | Strauss | 281/34 |

(List continued on next page.)

FOREIGN PATENT DOCUMENTS

| 163453 | 12/1985 | European Pat. Off. | 47/41 R |
| 2948265 | 5/1981 | Fed. Rep. of Germany . | |
| 2036163 | 12/1970 | France . | |
| 2272914 | 12/1975 | France . | |
| 2489126 | 12/1982 | France . | |
| 8101464 | 3/1981 | Netherlands . | |
| 161005 | 6/1933 | Switzerland . | |
| 274167 | 6/1951 | Switzerland . | |
| 560532 | 4/1975 | Switzerland . | |
| 28130 | 9/1907 | United Kingdom . | |
| 1204647 | 8/1969 | United Kingdom . | |

OTHER PUBLICATIONS

Exhibit A. Curtis Wagner Co., Inc., Houston, Tex., shows thick, Stiff shiny red plastic pot cover with large scalloped border. (Photograph) Date unknown.

(List continued on next page.)

Primary Examiner—Richard J. Johnson
Attorney, Agent, or Firm—Dunlap, Codding, Peterson & Lee

[57] ABSTRACT

A flower pot for containing growing flowers or plants made by forming a sheet of material into a container having an upper end and a lower end with an object opening extending through the upper end and extending a distance through the container, the container having a plurality of overlapping folds for contributing to the rigidity of the container for cooperating in tending to maintain the formed shape of the container, and the container having a skirt extending a distance outwardly from the upper end of the container. After forming the container with the skirt outwardly extending therefrom, the skirt is formed in a downward direction to a position wherein the skirt is disposed generally near the outer peripheral surface of the container. When the plants or flowers are ready for shipment or display, the skirt again is formed or turned in the outwardly extending direction.

19 Claims, 1 Drawing Sheet

U.S. PATENT DOCUMENTS

| | | | |
|---|---|---|---|
| 1,924,926 | 8/1933 | Gray | 65/53 |
| 1,951,642 | 3/1934 | Augustin et al. | 47/34 |
| 1,978,631 | 10/1934 | Herrlinger | 91/68 |
| 1,979,771 | 11/1934 | Potter | 47/41 |
| 2,076,212 | 4/1937 | Suter et al. | 91/67.9 |
| 2,123,075 | 7/1938 | Langa | 47/66 |
| 2,152,648 | 4/1939 | Jones | 47/34 |
| 2,278,673 | 4/1942 | Savada et al. | 154/43 |
| 2,355,559 | 8/1944 | Renner | 229/8 |
| 2,411,328 | 11/1946 | Macnab | 33/12 |
| 2,510,120 | 6/1950 | Leander | 117/122 |
| 2,529,060 | 11/1950 | Trillich | 117/68.5 |
| 2,774,187 | 12/1956 | Smithers | 47/41 |
| 2,822,287 | 2/1958 | Avery | 117/14 |
| 2,827,217 | 3/1958 | Clement | 229/1.5 |
| 2,845,735 | 8/1958 | Werner | 41/10 |
| 2,942,823 | 6/1960 | Chapman | 248/97 |
| 2,967,652 | 1/1961 | Canfield | 229/5.5 |
| 3,013,689 | 12/1961 | Shropshire | 215/100.5 |
| 3,094,810 | 6/1963 | Kalpin | 383/104 X |
| 3,130,113 | 4/1964 | Silman | 161/97 |
| 3,376,666 | 4/1968 | Leonard | 47/11 |
| 3,552,059 | 1/1971 | Moore | 47/41.12 |
| 3,554,434 | 1/1971 | Anderson | 229/55 |
| 3,620,366 | 11/1971 | Parkinson | 206/59 C |
| 3,681,105 | 8/1972 | Milutin et al. | 117/15 |
| 3,775,903 | 12/1973 | Pike | 47/66 |
| 3,869,828 | 3/1975 | Matsumoto | 47/34.11 |
| 3,974,960 | 8/1976 | Mitchell | 383/908 X |
| 4,054,697 | 10/1977 | Reed et al. | 428/40 |
| 4,216,620 | 8/1980 | Weder et al. | 150/154 X |
| 4,250,664 | 2/1981 | Remke | 47/76 |
| 4,283,032 | 8/1981 | Smith | 248/97 |
| 4,297,811 | 11/1981 | Weder | 47/72 |
| 4,338,979 | 7/1982 | Dow | 141/10 |
| 4,340,146 | 7/1982 | Stratton | 215/100.5 |
| 4,380,564 | 4/1983 | Cancio et al. | 428/167 |
| 4,400,910 | 8/1983 | Koudstaal et al. | 47/84 |
| 4,413,725 | 11/1983 | Bruno et al. | 206/45.33 |
| 4,488,697 | 12/1984 | Garvey | 248/101 |
| 4,508,223 | 4/1985 | Cartrambone | 206/423 |
| 4,621,733 | 11/1986 | Harris | 206/423 |
| 4,717,262 | 1/1988 | Roen et al. | 383/120 |
| 4,733,521 | 3/1988 | Weder et al. | 53/580 |
| 4,773,182 | 9/1988 | Weder et al. | 47/72 |
| 4,795,601 | 1/1989 | Cheng | 264/138 |
| 4,835,834 | 6/1969 | Weder et al. | 29/525 |

OTHER PUBLICATIONS

Exhibit B. Jacobson Pot Cover Company of Scranton, Pa. advertising literature. Date of first use unknown.

Exhibit C. Photograph of pot cover, manufacturer unknown, but very similar to #C21 on Exhibit B (Jacobson literature).

Exhibit D. Photocopy of photo of pot cover ("Platform Pot Dresser") made by John Raisen Corp., San Francisco, Calif. Date of first use unknown.

Exhibit E. Photograph of 2-part pot cover system made by Floral Decor, subsidiary of John Henry Co., Lansing, Mich.

Exhibit F. Photo of pot cover made by a Holland company (K.P.I.). Date of first public use believed to be late 1984.

Exhibit G. "The Glass of Frederick Carder", copyright 1971 by P. V. Gardner, showing various styles of glass basket-like vases or containers.

Exhibit H. "Speed Cover ®" brochure, published in 1983 by Applicants, showing various pot covers for sale.

Exhibit I. "Speed Cover ®" brochure, published in 1983 by Applicants, showing various pot covers for sale.

Exhibit J. Item published in 1936 by Gellman Bros., Minneapolis, Minn. shows an assortment of paper hats.

Exhibit K. Photo of various other flower pot wrappings, sold in rolls or sheets and used in the floral industry for years.

Exhibit L. Photo of pot cover made of woven straw-like material.

Exhibit L. Photo of basket-type pot cover used in the floral industry.

Exhibit N. "Speed Cover ®" brochure, published in 1984 by Applicants, showing various pot covers for sale.

It is also known to shape a sheet of shape-sustaining wrapping material, such as foil, to a pot using a board with a central hole, the diameter being greater than the diameter of the pot, by pushing the pot through the hole pulling the wrapping through through the hole so that the wrapping is gathered around the pot.

METHOD OF FORMING A FLOWER POT

CROSS-REFERENCE TO RELATED APPLICATIONS

This application is a continuation-in-part of Ser. No. 219,083, filed July 13, 1988, now U.S. Pat. No. 4,897,031 entitled ARTICLE FORMING SYSTEM, which is a continuation of U.S. Ser. No. 004,275, filed Jan. 5, 1987, entitled ARTICLE FORMING SYSTEM, now U.S. Pat. No. 4,773,182, which is a continuation of U.S. Ser. No. 613,080, filed May 22, 1984, entitled ARTICLE FORMING SYSTEM, now abandoned.

FIELD OF THE INVENTION

The present invention relates generally to a flower pot and, more particularly, but not by way of limitation, to a flower pot constructed of a relatively flexible material.

DESCRIPTION OF THE PREFERRED EMBODIMENTS

In the co-pending application entitled ARTICLE FORMING SYSTEM, referred to before, there was described an apparatus and method for constructing a flower pot cover wherein a sheet of material was placed between a male and a female mold. The male and the female mold were brought to a mating position with the sheet of material disposed therebetween for forming the flower pot cover. This co-pending application specifically is incorporated herein by reference.

The flower pot cover described in the co-pending application could be used to grow flowers as well as cover a flower pot. One of the problems encountered in using a flower pot cover with a skirt to grow flowers is that the skirt takes up a great deal of space on a grower's bench.

Figure 1:
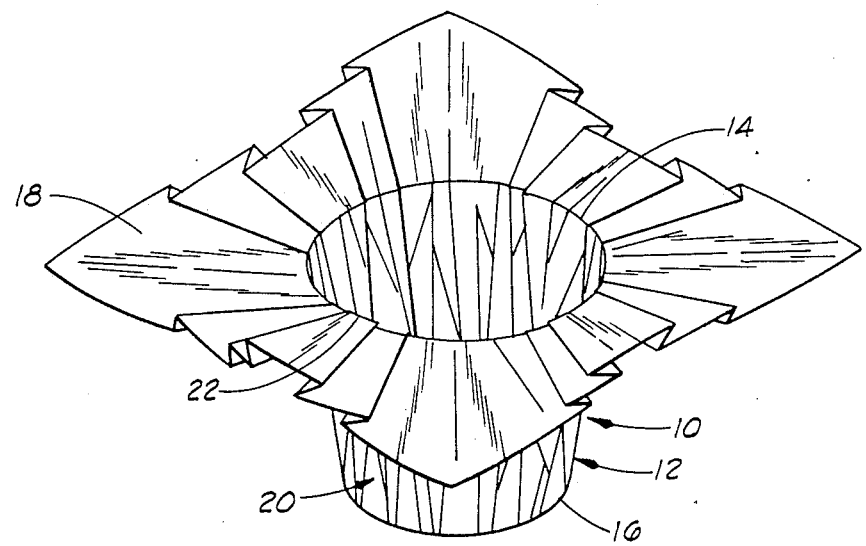
FIG. 1 is a partial perspective view of a flower constructed in accordance with the present invention showing the skirt portion in an upturned position.
Figure 2:
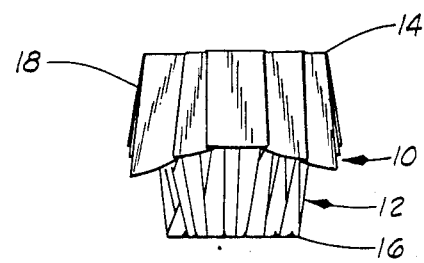
FIG. 2 is a side elevational view of the flower pot of FIG. 1, but showing the skirt in a downturned position.

The present invention consists of a flower pot for containing growing flowers or plants, the flower pot being shown in FIGS. 1 and 2 and designated therein by the general reference numeral 10. The flower pot 10 is made by forming at least one sheet of material into a container 12 having an open upper end 14 and a lower end 16. The lower end 16 of the container 12 is closed, but may include drain holes. A skirt 18 is formed on the upper end 14 of the container 12 and the skirt 18 extends generally outwardly and upwardly from the upper end 14 of the container 12. The container 12 includes an object opening formed through the upper end 14 and extending a sized and shaped for receiving the growing materials and portions of the flowers or plants to be grown in a manner well known in the art.

The container 12, as shown in FIG. 1, is formed and appears exactly like the flower pot cover shown in the co-pending application entitled ARTICLE FORMING SYSTEM U.S. Pat. No. 4,773,182. The container 12 includes a plurality of overlapping folds diagrammatically shown in FIG. 1 and designated therein by the general reference numeral 20. The overlapping folds 20 cooperate to contribute to the rigidity of the container 12 for cooperating in tending to maintain the formed shape of the container 12. The overlapping folds may be heat sealed or sealed with an adhesive or combinations thereof.

After the container 12 has been formed in the manner just described, the container 12 with the skirt 18 extending outwardly and upwardly therefrom is permitted to cool assuming heat has been used in the forming process so that a crease 22 extending between the container 12 and the skirt 18 is permitted to set and so that the container 12 with the overlapping folds 20 therein is permitted to set. After this setting period of time, the skirt 18 on the container 12 is formed in a downwardly direction so that the skirt 18 is disposed generally near the outer peripheral surface of the container 12. The skirt formed in the downward direction as just described and as shown in FIG. 2 provides some measure of protection for the container 12 and the outer surface of the skirt from dirt and light during the growing process which otherwise might tend to cause the outer peripheral surface of the container 12 or the outer peripheral surface of the skirt 18 to fade or deteriorate.

With the downward turned skirt, as shown in FIG. 2, the plants or flowers are grown in the flower pot cover 10 in the usual manner known in the art. When the plants or flowers have been grown and it is time to ship the grown plants or flowers, the skirt then can be easily upturned so that the skirt 18 extends upwardly and outwardly from the container 12 in the manner shown in FIG. 1.

In one preferred embodiment, the sheet of material is constructed from a relatively thin film of a substantially non-shape sustaining processed organic polymer film. The term "processed organic polymer film" as used herein means a man-made resin such as a polypropylene as opposed to naturally occurring resins such as cellophane. A processed organic polymer film is relatively strong and not as subject to tearing (substantially non-tearable), as might be the case with paper or foil. The processed organic polymer film is a substantially linearly linked processed organic polymer film and is a synthetic linear chain organic polymer where the carbon atoms are substantially linearly linked. Such films are synthetic polymers formed or synthesized from monomers. Further, a relatively substantially linearly linked processed organic polymer film is virtually waterproof which may be desirable in many applications which is not the case with an untreated paper, for example, unless the paper is treated with a water resistant coating or impregnated with a water resistant material or laminated with such water resistant material. It also should be noted that some papers, such as long fiber papers, are substantially resistant to tearing (substantially nontearable). In addition, a relatively thin film of a substantially linearly linked processed organic polymer does not substantially deteriorate in sunlight. Processed organic polymer films having carbon atoms, both linearly linked and cross linked, and some cross linked polymer films, also may be suitable for use in the present invention provided such films are substantially flexible, can be made in a sheet-like format for forming into the flower pot 10 of the present invention.

A decorative pattern, such as a solid color and/or an embossed pattern, and/or other decorative surface ornamentation may be applied to the inner surface and/or the outer surface of the flower pot 10.

The flower pot 10 may be constructed of a single sheet of material or a plurality of sheets of material. When constructed of a plurality of sheets of material, each sheet of material has a thickness in a range of from less than about 1.0 mil to about 2.5 mils. However, the upper limit on the thickness of each sheet of material could be as high as 20.0 mils depending on the type of material selected. Further, the resulting flower pot has a thickness in a range of from less than about 1.0 mils to about 2.5 mils which could be as high as 20.0 mils depending upon the number of sheets of material utilized and the type of materials selected.

Figure 3:
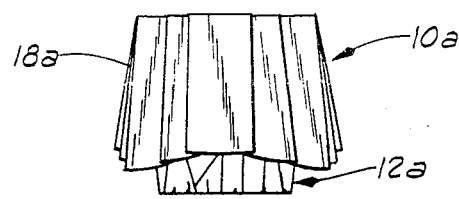
FIG. 3 is a side elevational view of a modified flower pot constructed similar to the flower pot shown in FIGS. 1 and 2, but having a longer length of skirt.

Shown in FIG. 3 is a modified flower pot 10a having a modified container 12a. The flower pot 10a and the container 12a are constructed in a manner exactly like that described before with respect to the flower pot 10 shown in FIG. 1 and 2, except the skirt 18a is substantially longer than the skirt 18 shown in FIGS. 1 and 2 so that the skirt 18a will substantially cover the container 12a when the skirt 18a is moved to the folded down position as shown in FIG. 3.

Changes may be made in the various parts, elements and assemblies as described herein, or in the steps of the methods described herein, or in the sequence of the steps of the methods described herein without departing from the spirit and scope of the invention as defined in the following claims.

I claim:

1. A method for making a flower pot or flower pot cover comprising the steps of:
    forming a sheet of material into a container having an outer periphery, an upper end and a lower end with an object opening through the upper end and extending a distance through the container, the container having a plurality of overlapping folds contributing to the rigidity of the container for cooperating in tending to maintain the formed shape of the container, the container having a skirt formed on the upper end thereof and extending a distance generally outwardly therefrom; and
    forming the entire skirt in a generally downwardly direction after forming the sheet of material into the container with the overlapping folds with the skirt extending a distance generally outwardly from the upper end of the container, the entire skirt extending in a generally downwardly direction about the entire outer periphery of the container so that the skirt encompasses at least an upper portion of the outer periphery of the flower pot or flower pot cover, whereby the shirt skirt is extendable downwardly during the growing of plants or flowers for protecting the outer periphery of the flower pot and, after the growing of such plants or flowers, the skirt is extendable upwardly and outwardly for forming a decorative skirt to enhance the displaying of the grown plants or flowers.

2. The flower pot of claim 1 wherein the sheet of material has a thickness in a range from less than about 1.0 mil to about 20.0 mils.

3. The flower pot of claim 1 wherein the flower pot has a thickness in a range from less than about 1.0 mil to about 20.0 mils.

4. The method of claim 1 wherein the sheet of material has a thickness in a range from less than about 1.0 mil to about 2.5 mils.

5. The method of claim 1 wherein the container has a thickness in a range from less than about 1.0 mil to about 2.5 mils.

6. The method of claim 1 wherein the sheet of material is defined further as being constructed of a processed organic polymer film.

7. The method of claim 1 wherein the sheet of material is defined further as being constructed of a material selected from a group of materials consisting of foil, cellophane, paper or processed organic polymer film.

8. The method of claim 1 wherein the overlapping folds of the container are defined further as being sealed.

9. The method of claim 1 wherein the sheet of material is defined further as being constructed of a flexible sheet of material.

10. The method of claim 9 wherein the container may be flattened and reshaped to substantially its original shape.

11. The method of claim 9 wherein the container may be flattened and reshaped to substantially its original shape.

12. A method for making a flower pot or flower pot cover comprising the steps of:
    forming a sheet of material into a container having an outer periphery, an upper end and a lower end with an object opening extending through the upper end and extending a distance through the container, the container having a skirt formed on the upper end thereof and extending a distance generally outwardly therefrom; and
    forming the entire skirt in a generally downward direction after forming the sheet of material into the container with the skirt extending a distance generally outwardly from the upper end of the container, the entire skirt extending in a generally downwardly direction about the entire periphery of the container so that the skirt encompasses at least in upper portion of portion of the outer periphery of the flower pot of flower pot cover, whereby the outre skirt is extendible downwardly during the growing of the plants or flowers for protecting the outer periphery of the flower pot and, after the growing of such plants or flowers, the skirt is extendible upwardly and outwardly for forming a decorative skirt to enhance the displaying of the grown plants or flowers.

13. The method of claim 12 wherein the sheet of material has a thickness in a range from less than about 1.0 mil to about 20.0 mils.

14. The method of claim 12 wherein the flower pot has a thickness in a range from less than about 1.0 mil to about 20.0 mils.

15. The method of claim 12 wherein the sheet of material has a thickness in a range from less than about 1.0 mil to about 2.5 mils.

16. The method of claim 12 wherein the container has a thickness in a range from less than about 1.0 mil to about 2.5 mils.

17. The method of claim 12 wherein the sheet of material is defined further as being constructed of a processed organic polymer film.

18. The method of claim 12 wherein the sheet of material is defined further as being constructed of a material selected from a group of materials consisting of foil, cellophane, paper or processed organic polymer film.

19. The method of claim 12 wherein the sheet of material is defined further as being constructed of a flexible sheet of material.

* * * * *

UNITED STATES PATENT AND TRADEMARK OFFICE
CERTIFICATE OF CORRECTION

PATENT NO. : 4,950,216
DATED : August 21, 1990
INVENTOR(S) : Donald E. Weder

It is certified that error appears in the above-identified patent and that said Letters Patent is hereby corrected as shown below:

Column 1, line 21, the word --pot-- should be added after the word, flower.

Column 1, line 60, after the word, a, the following phrase should be added --distance through the container 12. The object opening is--.

Column 4, line 37, the word "in" should be "an".

Column 4, line 37, delete "of portion".

Column 4, line 38, delete the second word "of" and substitute the word --or--.

Column 4, line 39, delete the word "outre" and substitute therefore the word --outer--.

Signed and Sealed this

Seventh Day of April, 1992

Attest:

HARRY F. MANBECK, JR.

*Attesting Officer*     *Commissioner of Patents and Trademarks*